March 13, 1951 H. F. RATH 2,544,861
RAKE WITH ADJUSTABLY CONNECTED BOTTOM AND BACK PANELS
Filed Sept. 12, 1949 2 Sheets-Sheet 1

Harry F. Rath
INVENTOR.

BY Clarence A. O'Brien
and Harvey B. Jacobson
Attorneys

March 13, 1951  H. F. RATH  2,544,861
RAKE WITH ADJUSTABLY CONNECTED BOTTOM AND BACK PANELS
Filed Sept. 12, 1949  2 Sheets-Sheet 2
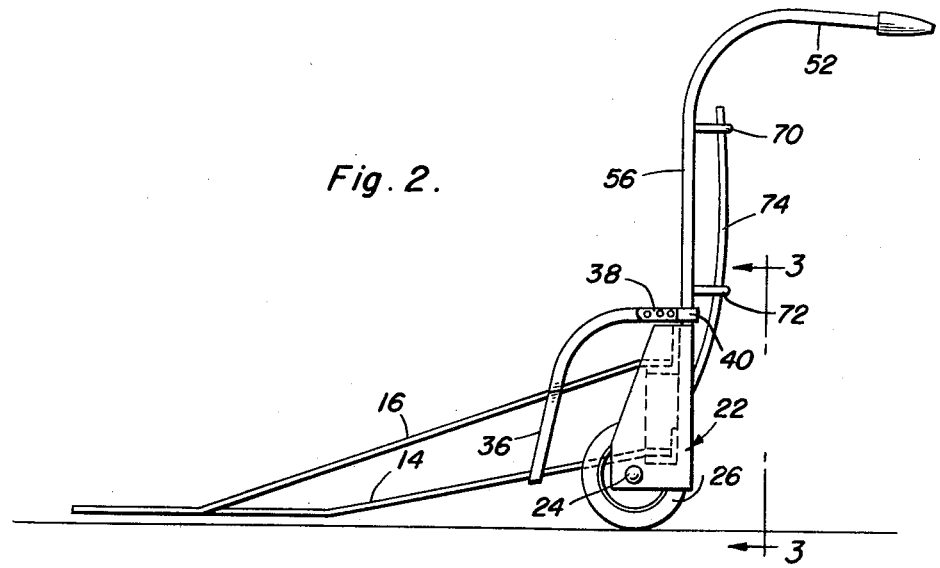
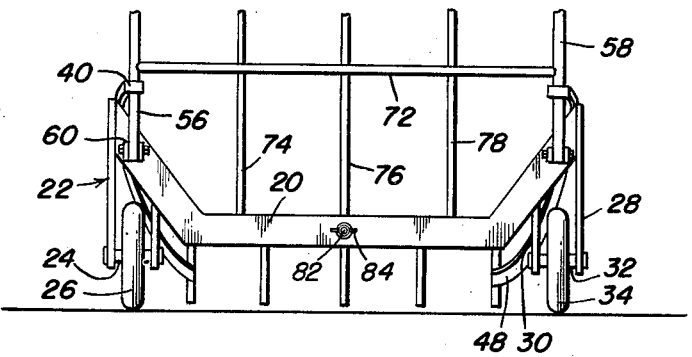
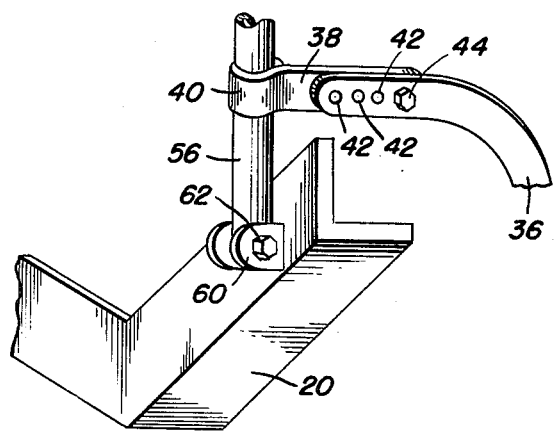
Harry F. Rath
INVENTOR.

UNITED STATES PATENT OFFICE 2,544,861

RAKE WITH ADJUSTABLY CONNECTED BOTTOM AND BACK PANELS

Harry F. Rath, Glen Flora, Wis.

Application September 12, 1949, Serial No. 115,218

2 Claims. (Cl. 56—400.14)

This invention relates to novel and useful improvements in farm implements.

An object of this invention is to scoop hay, and the like on a rake formed by a number of generally horizontal tines which are connected together by a cross member and by a back panel which consists of a number of connected rods, the back and the front panels being adjustably and removably connected together and the entire assemblage being supported on a pair of wheels for facility of movement and maneuverability.

Other objects will become apparent in following the description of the illustrated form of the invention.

Figure 2 is a side view of the device shown in Figure 1;

Figure 3 is a rear view of the device and taken substantially on the line 3—3 of Figure 2;

Figure 4 is an enlarged perspective view showing the manner of attachment of one of the handles to the cross member, and;

Figure 1:
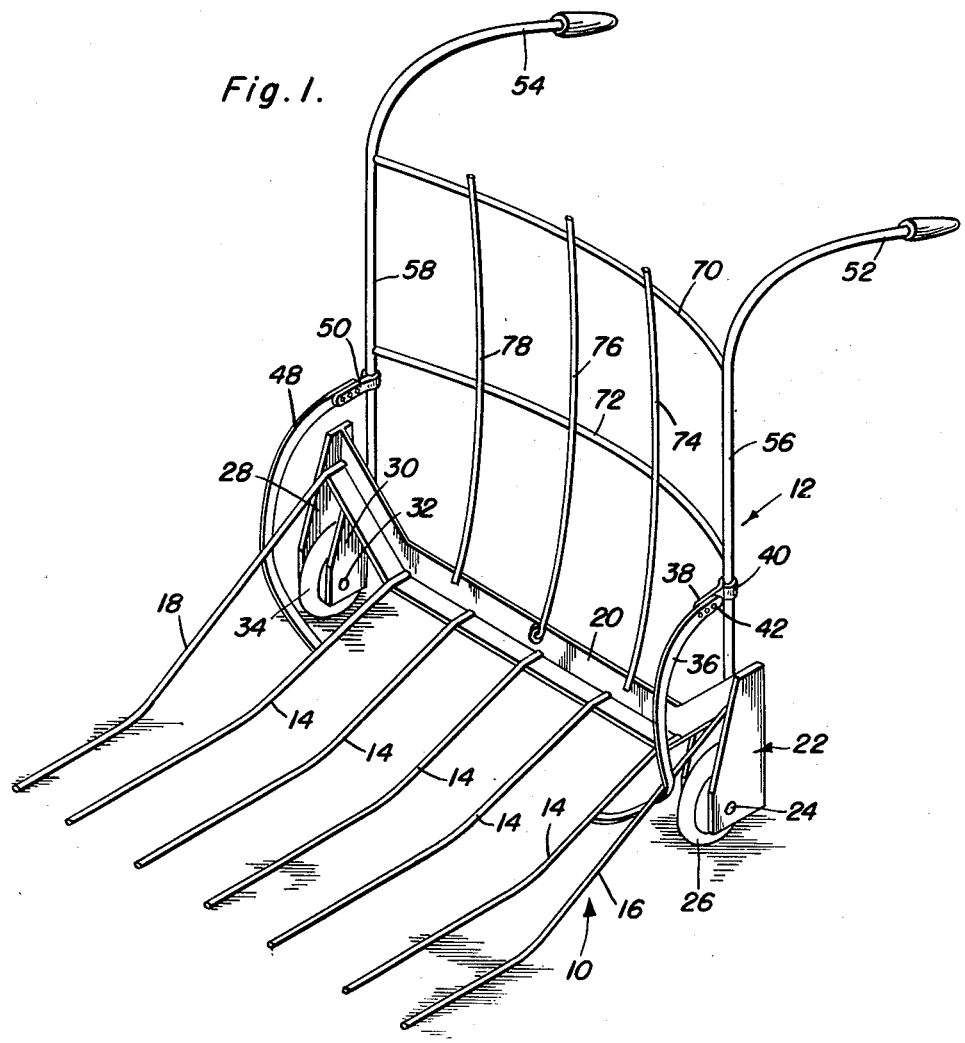
Figure 1 is a perspective view of the device.
Figure 5:
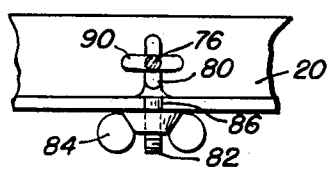
Figure 5 is a partial sectional view showing part of the back panel in section, and the fastening means for the back and front panels.

The present invention has utility particularly in connection with farming and farming operations. The article of invention is a rake of improved construction and extreme maneuverability.

The rake consists of two main sections, the front or bottom panel 10 and the back panel 12. The front panel 10 consists of an appropriate number of tines 14, five tines having been illustrated. However, a greater or lesser number of tines may be employed. The tines are not absolutely straight but have a bend of a slight degree therein intermediate their ends so that the leading part of the front or bottom panel 10 of the rake is horizontal when the device is in use, whereas the back part of each tine is disposed at a slight angle, (see Figure 2).

The end tines 16 and 18 respectively have a sharper degree of angularity and the bend therein is in advance of the bends in the tines 14.

A rear cross member 20 composed of angle stock is secured across the rear ends of all of the tines. Wheel assemblies are provided on each end of the rear cross member 20. The wheel assembly on one side of the machine includes the pair of plates forming a support 22 accommodating the axle 24 for the wheel 26. The other assembly consists of a pair of plates 28 and 30 supporting the axle 32 which has the wheel 34 mounted thereon.

Means securing the back panel 12 to the bottom panel 10 of the rake is provided. This means consists of a curved bar 36 with a straight bar 38 extensibly connected with one end thereof. The bar 38 has a bearing 40 at one end thereof and a number of openings in the other end thereof. Openings 42 are provided in the upper end of the curved bar 36 so that a bolt 44 may be passed therethrough and through the one or more openings in the bar 38. This adjusts the front panel 10 of the rake with respect to the back panel 12 in that the lower end of the bar 36 is welded or otherwise fixed to the tine 16 and the first tine of the series indicated at 14.

An identical structure is provided in connection with the opposite side of the rake. The curved bar 48 is connected with the bar 50 formed of a straight length of strap, and the adjusting assembly including the hole and bolt is operatively connected therewith.

The back 12 is made of bar stock. A pair of handles 52 and 54 having straight shanks 56 and 58 respectively are pivoted to the cross member 20 by means of the brackets 60 with a pivot pin 62 passed therethrough and through the lower end of the shanks. The bearings on the ends of the bars 38 and 50 are disposed on the shanks 56 and 58 respectively.

A pair of transverse curved rods 70 and 72 respectively are rigidly secured to the handle shanks 56 and 58. For illustrative purposes only, three substantially vertical curved rods 74, 76 and 78 respectively are welded or otherwise rigidly secured to the transverse curved rods 70 and 72. The lower ends of the rods 74 and 76 are on the forward side of the upstanding flange of the angle cross member 20. The lower end of the curved rod 76 is also disposed on the front surface of this flange but is received in the eye 80.

The eye 80 has a threaded shank 82 extending therefrom with a wing nut 84 thereon. Since the shank passes through an opening 86 in the upstanding flange of the member 20, tightening the wing nut 84 will pull the eye toward the upstanding flange. There is a hook 90 on the lower end of the curved rod 76 which is engaged in the eye 80. This helps to maintain the back of the rake in assembled condition on the said front thereof.

To remove the back panel from the front panel of the rake, it is only necessary to remove the pivot pins 62, release the adjusting assemblies in connection with the curved bars 36 and 48 and remove the wing nut from the eye shank 82. Then, the back panel is disassembled from the front or bottom panel of the device.

Having described the invention, what is claimed as new is:

1. A rake comprising a number of tines forming a bottom panel and having a cross member connected to the rear ends thereof, wheels carried by said cross member, a plurality of connected rods forming a back panel with handles extending therefrom, means adjustably and detachably securing said bottom panel to said handles, said means including extensibly connected bars secured to some of said tines and said handles, and means located intermediate the ends of said cross member for releasably attaching said front panel to said back panel.

2. The combination of claim 1 and the last-mentioned means comprising an eye-bolt with the lower end of one of said rods hooked in said eye-bolt, said eye-bolt being carried by said cross member, and means attached to said eye-bolt releasably holding said eye-bolt connected with said cross member.

HARRY F. RATH.

REFERENCES CITED

The following references are of record in the file of this patent:

UNITED STATES PATENTS

| Number | Name | Date |
|---|---|---|
| 210,924 | Davis | Dec. 17, 1878 |
| 323,252 | Alexander et al. | July 28, 1885 |
| 1,763,473 | Mehl | June 10, 1930 |
| 1,763,757 | Charles | June 17, 1930 |
| 1,923,381 | Layne | Aug. 22, 1933 |
| 2,215,592 | Nelson | Sept. 24, 1940 |